United States Patent
Blythe et al.

(10) Patent No.: US 6,508,451 B1
(45) Date of Patent: Jan. 21, 2003

(54) ACCESSORY SUPPORT APPARATUS FOR HAND HELD DEVICE

(76) Inventors: Paul R. Blythe, 1169 W. Summit St., Winterset, IA (US) 50273; Michael P. Marshall, 531 Grant St., Bettendorf, IA (US) 52722

( * ) Notice: Subject to any disclaimer, the term of this patent is extended or adjusted under 35 U.S.C. 154(b) by 0 days.

(21) Appl. No.: 09/922,260

(22) Filed: Aug. 6, 2001

(51) Int. Cl.7 .............................................. A47G 29/00
(52) U.S. Cl. ..................................... 248/688; 248/351
(58) Field of Search ................................ 248/688, 351, 248/469, 224.51, 223.41, 225.11; 403/331

(56) References Cited

U.S. PATENT DOCUMENTS

| | | | | |
|---|---|---|---|---|
| 634,146 A | * | 10/1899 | Maddox | 40/745 |
| 3,319,060 A | * | 5/1967 | Bartley | 240/73 |
| 4,113,212 A | | 9/1978 | Coriden | |
| 4,441,268 A | * | 4/1984 | Scott | 40/152.1 |
| 4,460,946 A | * | 7/1984 | Tinz | 362/319 |
| 4,940,204 A | * | 7/1990 | Nelson et al. | 248/688 |
| 5,026,016 A | * | 6/1991 | Lisowski | 248/314 |
| 5,054,159 A | * | 10/1991 | Richardson | 15/400 |
| 5,128,829 A | | 7/1992 | Loew | |
| 5,707,033 A | * | 1/1998 | Holt et al. | 248/225.11 |
| 5,832,646 A | * | 11/1998 | Albin et al. | 40/762 |
| 6,003,831 A | * | 12/1999 | Coleman | 248/688 |

* cited by examiner

Primary Examiner—Ramon O. Ramirez
Assistant Examiner—Kofi Schulterbrandt
(74) Attorney, Agent, or Firm—Camille L. Urban; G. Brian Pingel

(57) ABSTRACT

An accessory support apparatus for a hand held electronic device to provide hands free use and stability thereof includes a connector bar and a support member that are attachable by integrally formed coupling members. In a first preferred embodiment the support member is in the form of a support stand that is attachable to the connector bar and includes a leg and a bracket portion and a hinge portion located therebetween to provide for relative movement of the leg with respect to the bracket portion. In a second preferred embodiment, the support member is in the form of a bracket bar that is attachable to a desired surface so that when the connector bar is coupled thereto, the hand held electronic device is maintained in a fixed position on the wall.

14 Claims, 6 Drawing Sheets

ACCESSORY SUPPORT APPARATUS FOR HAND HELD DEVICE

BACKGROUND OF THE INVENTION

1. Field of the Invention

The present invention relates in general to a support apparatus for hand held devices such as small electronic calculators, computers, video games, or global positioning devices and more specifically resides in a support apparatus that can be utilized as a stand to elevate the visual display of the devices or to attach the device in a semi-permanent position on a wall or the like.

2. Description of the Prior Art

With the advent of printed circuit chips, a wide variety of hand held electronic devices such as calculators, computers and video games have been manufactured and sold throughout the world. Typically, such hand held electronic devices have a generally planar backside so that they lie flat upon a desktop or other type supporting surface. In such position, the keyboard or operating buttons of the device are not as accessible as they would be if the device was in an inclined position and the visual display that these devices contain is not in an optimum viewing position for a user.

To overcome the above deficiency of normal hand held electronic devices, collapsible calculator stands are disclosed in the prior art for elevating the keyboard and visual display of such devices during their use. For example, U.S. Pat. No. 4,113,212 discloses a collapsible electronic calculator stand that is formed from a base that is attachable to the back of an electronic device and a leg that can be pivotally mounted to the base for movement between an open position for supporting the calculator at an angle and a collapsed position lying flat against the back of the device.

Another type of support structure for a hand held electronic device is disclosed in U.S. Pat. No. 5,128,829 and is comprised of a hinged cover that overlies the top face of the computer housing in a closed position, and in an open position the cover is pivoted to lie adjacent the rear face of the housing and is latchable in such position to serve as a stand to elevate the top end of the housing.

Both of the above described prior art structures appear to be functional and useful in their operation for elevating the keyboard and display of a hand held electronic device. However, these devices do not provide a light weight, flexible support that locks the hand held device into place relative to the support.

In addition, not all use of hand held electronic devices are made on a desk or tabletop as in certain instances, it may be highly desirable to be able to attach a hand held electronic device to an upstanding wall so that it is by a particular work station or is more readily accessible to the personnel using it. Neither of the above described structures show or suggest any means for accomplishing such attachment.

The present invention is adapted to provide a highly flexible and yet relatively structurally simplistic arrangement for providing a structure that is securely attachable to a hand held electronic device for either supporting the device on a table top or attaching it to a surface.

SUMMARY OF THE INVENTION

The present invention provides an accessory support apparatus for hand held electronic devices to provide hands free use and stability thereof. The support apparatus in a first preferred embodiment includes an elongated universal connector bar and a support member in the form of a support stand that are attachable together by cooperating coupling means on the connector bar and the support member.

The connector bar includes a generally flat side with means to affix the connector bar to a hand held device, and a second generally flat side opposite the first flat side and having an integrally formed and raised first coupling means protruding therefrom. The support member also includes an integrally formed and raised coupling means that mates with the coupling means on the connector bar to form a secure and stable connection therebetween. The support member of the first preferred embodiment comprised a support stand that is formed with a leg of a generally triangular shape, a bracket portion and a hinge portion located between the leg and said bracket portion to provide for relative movement between the bracket portion and the leg and a lock-tab associated with the hinge portion to maintain the position of the leg relative to the device when in an open position.

A second preferred embodiment of the present invention includes a connector bar similar to that of the first preferred embodiment, but differs from the first embodiment in that the support member is in the form of a bracket bar rather than a support stand. The purpose of this embodiment is to permit the attachment of a hand held electronic device to a wall or other type of side surface. The bracket bar includes a generally flat first side that has means to affix the bar to a desired surface and a second generally flat side that has an integrally formed and raised second coupling means that mates with the coupling means of the connector bar to form a connection therebetween. Accordingly, through the use of the second embodiment, the hand held electronic device can be attached to any type of desired surface depending on where the bracket bar is affixed.

In view of the above, it can be seen that it is an object of the present invention to provide a support apparatus for a hand held electronic device that permits for a varied placement of the device depending upon the particular needs of the user.

It is a further object of the present invention to provide a support apparatus that is relatively simplistic in structure and yet is adaptable by the user to either place the device on a supporting surface or in a desired elevated position on a desk or table top.

It is yet a further object of the present invention to provide a locking mechanism to maintain stability when the device is in an elevated position on a desk or table top.

It is an additional object of the present invention to provide a support apparatus for a hand held device that reliably affixes the device in a position as preferred by the user through the use of coupling means that are slidably engageable together in a semipermanent association.

Still further objects and advantages of the present invention will be apparent to those of ordinary skill in the art having reference to the following specification and the accompanying drawings.

DETAILED DESCRIPTION OF THE PREFERRED EMBODIMENTS

Figure 1:
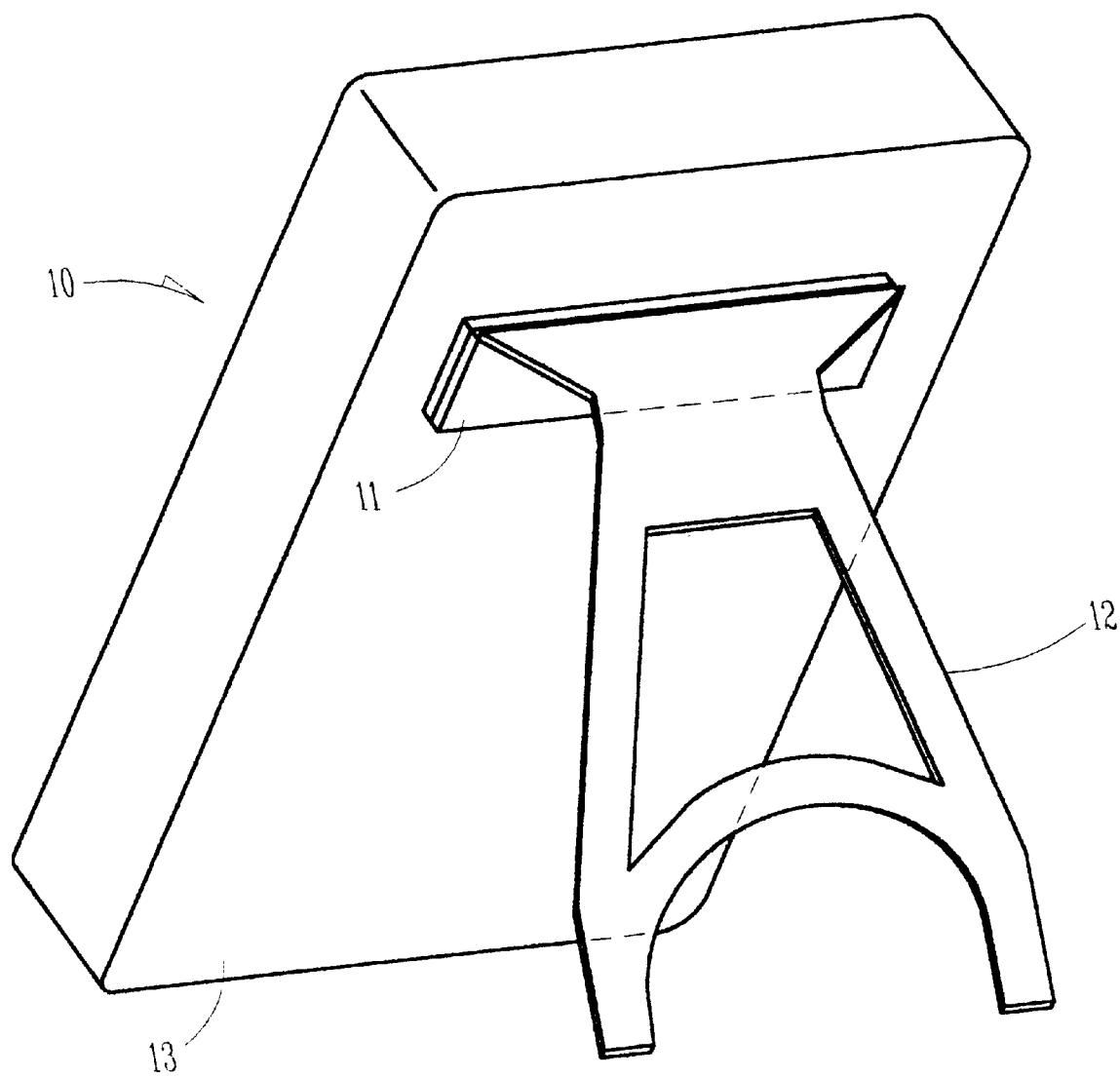
FIG. 1 is a perspective view of a hand held computer with a first preferred embodiment of the present invention attached thereto and formed of a universal connector bar and a support stand.

With reference now to the drawings, a first preferred embodiment of the accessory support apparatus for hand held electronic devices is shown at 10 in FIG. 1. The apparatus 10 is formed of a universal connector bar 11 and a support member in the form of a stand 12 that are shown in association with the back of a hand held computer 13.

Figure 2:
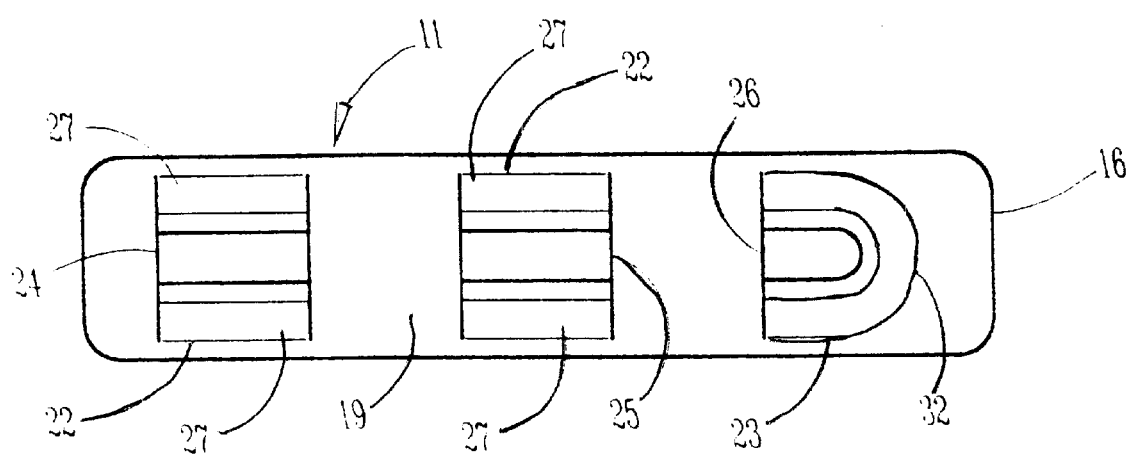
FIG. 2 is a plan view of the universal connector bar of FIG. 1.
Figure 3:
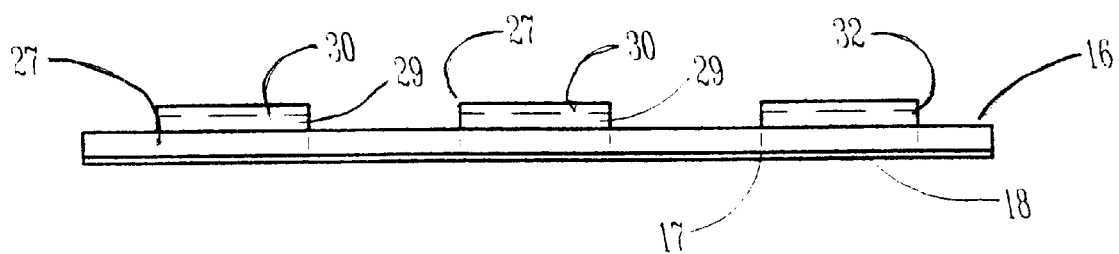
FIG. 3 is a side view in elevation of the universal connector bar of FIG. 1.

The connector bar 11 is formed of an elongated relatively thin strip 16 that is preferably formed from plastic such as polypropylene. As shown best in FIG. 3, affixed to a rear side 17 of the strip 16 is a piece of dual sided adhesive tape 18 that is employed for attachment of the connector bar 11 to the computer 13. Referring now to FIG. 2, integrally formed on a front side 19 of the strip 16 is a first coupling means 20 comprised of two pairs of spaced apart track members 22 and a limit of movement member 23 that extend outwardly from peripheral edges of apertures 24, 25 and 26 in the strip 16.

The tracks 22 are formed of opposed, parallel aligned tabs 27 that are "L" shaped in cross-section to protrude from the strip 16. The tabs 27 each include a lower leg portion 29 with an upper flange portion 30. The limit of movement member 23 is also of a "L" shape in cross-section, but has a curved configuration with a closed end 32 for a purpose to be described below.

Figure 4:
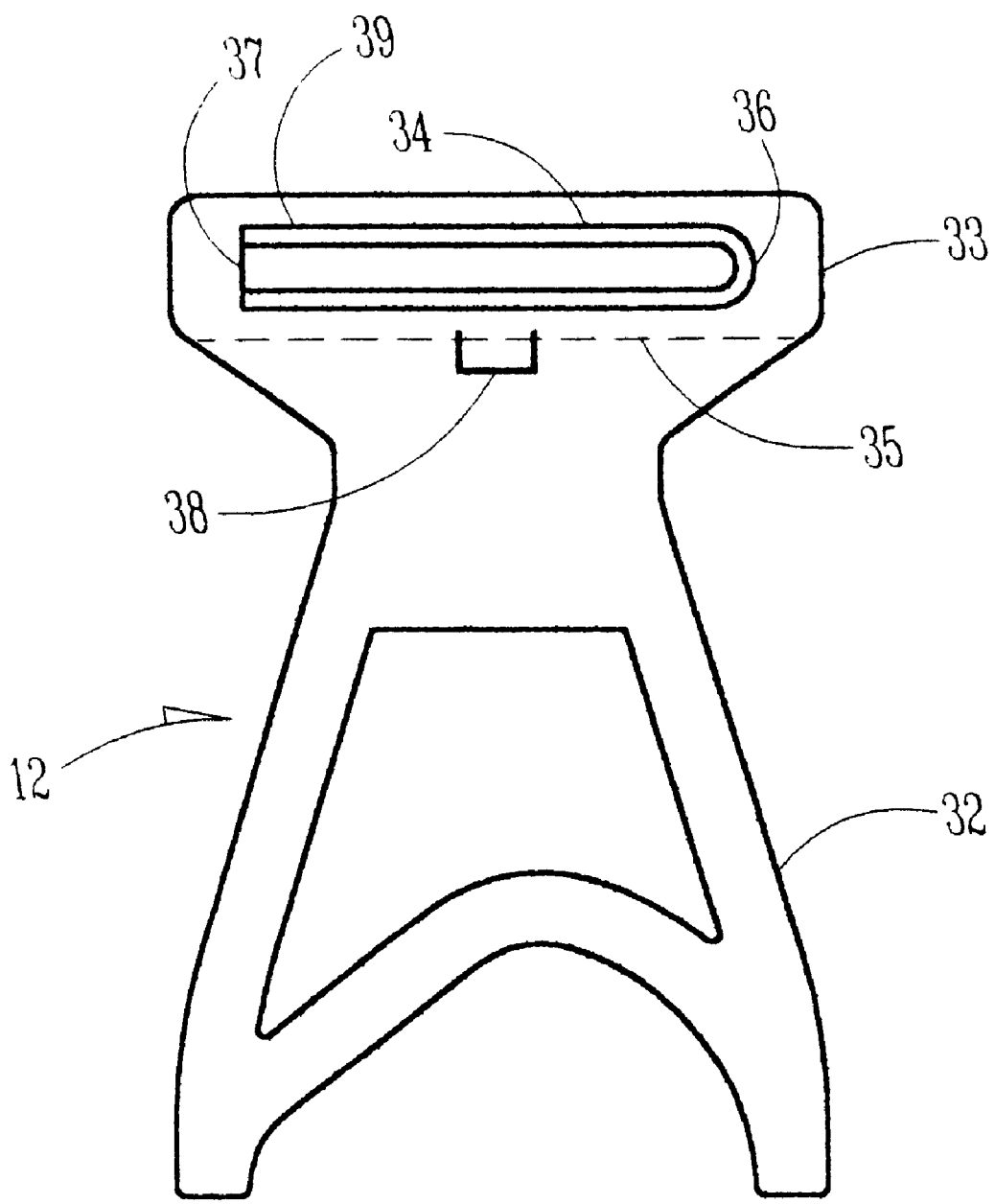
FIG. 4 is a plan view of the support stand of FIG. 1.
Figure 5:
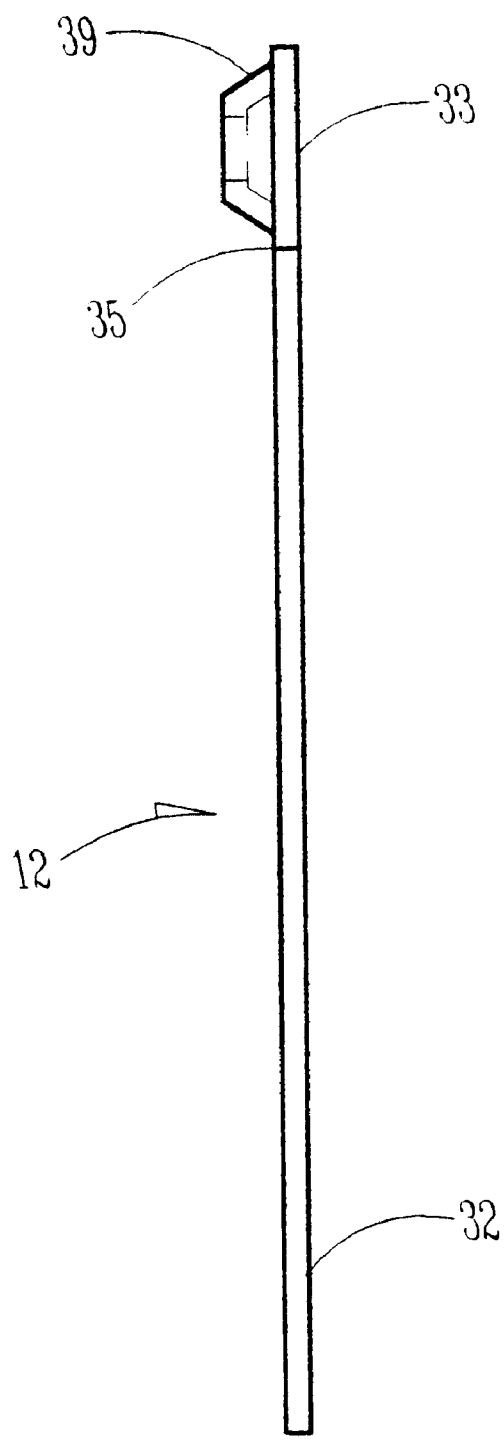
FIG. 5 is a side view in elevation of the support stand of FIG. 1.

The support stand 12 is also preferably made from plastic and, as shown in FIG. 4, includes a flat relatively broad, but thin, leg portion 32 and an upper bracket portion 33 on which a coupling means 34 is integrally formed. A living hinge 35 is included in the stand 12 between the leg and bracket portions 32 and 33 to permit relative movement therebetween and a lock tab 38 is further associated with said living hinge 35 for a purpose to be described below.

The support stand coupling means 34 is comprised of an elongated wedge shaped or dovetailed rail member 39 with a curved end 36 and a blunt end 37. The coupling means 34 is slidably engageable with the first coupling means 20 by inserting the rail member 39 into the tracks 22 until the rail curved end 36 engages the limit of movement member 23 to securely affix the support stand 12 to the connector bar 11. As it should be obvious to those skilled in the art, the curvature of the rail member end 36 is useful in guiding the rail member 35 into the tracks 22.

With the apparatus 10 secured to the computer 13, the support stand leg portion 32 is movable with respect to the computer 11 from a closed condition adjacent the back of the computer 11 to an open condition in which it serves as a strut to elevate the top portion of the computer. Said leg portion 32 is maintained in the open condition by a lock tab 38 which snaps into place upon opening. Thus, the apparatus 10 acts to support the device 13 in an elevated position so that the keyboard and display of the computer 13 are in a better position for the convenience of a user.

Figure 6:
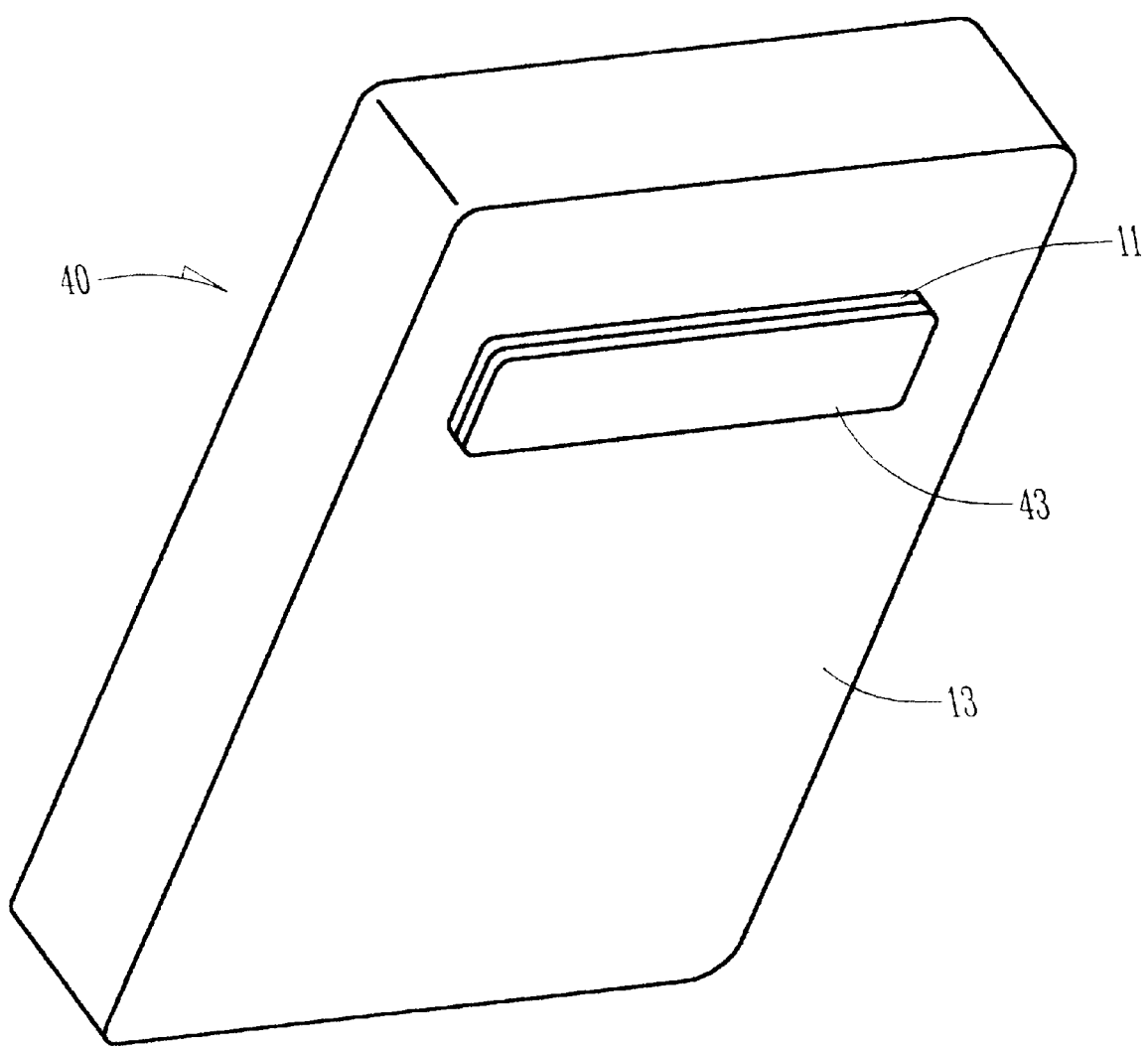
FIG. 6 is a perspective view of a hand held computer with a second preferred embodiment of the present invention attached thereto and formed of a universal connector and a bracket bar.

Referring now to FIG. 6, a second preferred embodiment of the support apparatus of the present invention is shown at 40 attached to the computer 13. Similar to the apparatus 10, the support apparatus 40 includes the universal connector bar 11. However, in place of the support stand 12, the apparatus 40 has a support member in the form of bracket bar 43 that is preferably similar in length to the connector bar 11 and is made from plastic.

Figure 7:
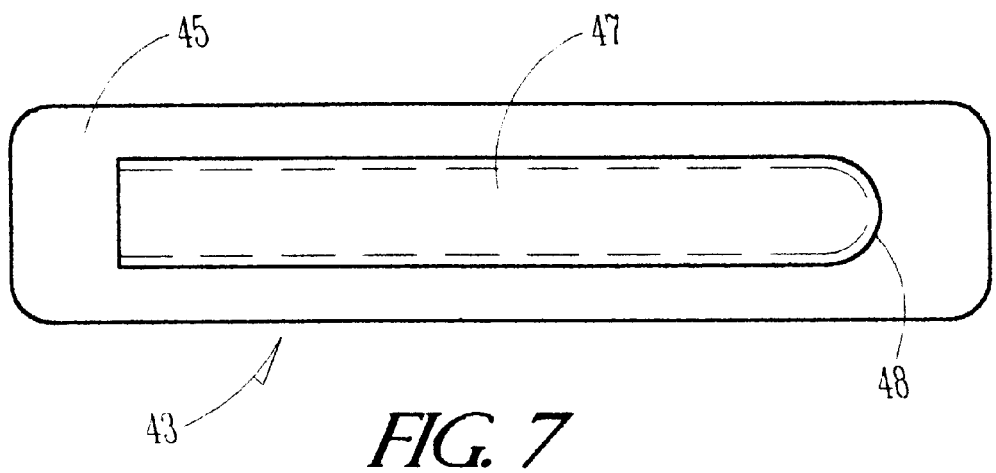
FIG. 7 is a plan view of the bracket bar of FIG. 6.
Figure 8:
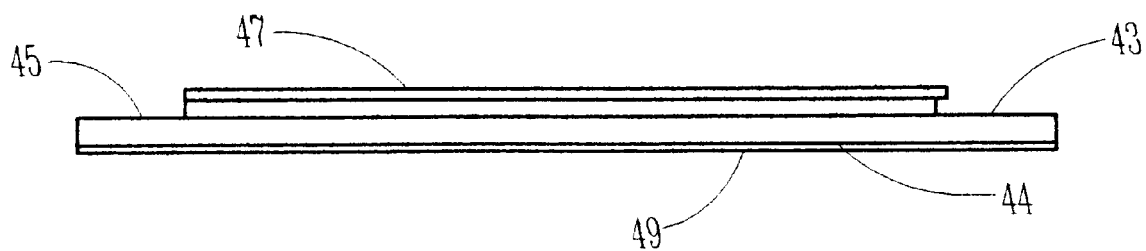
FIG. 8 is a side view in elevation of the bracket bar of FIG. 6.

As indicated by FIG. 8, the bracket bar 43 is relatively thin, with a flat rear side 44 and a front side 45. Protruding upwardly from the front side 45 is an integrally formed coupling means 46 in the shape of a wedge shaped rail member 47 that is similar in shape to the rail member 35. As can best be seen from FIG. 7, the rail member 47 has a curved end 48 to facilitate insertion of the rail member 47 into the tracks 22 of the universal connector bar 11 for securely attaching the connector bar 11 and the computer 13 to the bracket bar 43. Affixed to the rear side 44 of the bracket bar 43 is a piece of dual sided adhesive tape 49 so that the bracket bar 43 can be affixed, as desired, to a vertical wall surface or the like to permit as desired by a user.

Thus, the present invention provides two preferred embodiments of an accessory support apparatus for hand held electronic devices that permit a user the flexibility of either having the device supported on a table top in an elevated position or to position the device on a supporting surface as desired. While the invention has been described in connection with what is presently considered to be the most practical and preferred embodiment, it is to be understood that the invention is not limited to the disclosed embodiments. To the contrary, the true spirit and scope of the present invention covers various modifications and equivalent arrangements included within the appended claims.

What is claimed is:

1. An accessory support apparatus for a hand held electronic device to provide hands free use and stability thereof, said support apparatus comprising:
   (a) an elongated universal connector bar that includes;
      (1) a first generally flat side with means to affix said universal connector bar to said hand held device;
      (2) a second generally flat side opposite said first flat side;
      (3) an integrally formed and raised first coupling means on said second side; and
   (b) a support member that serves to hold said hand held device in a desired position and has an integrally formed and raised second coupling means that mates with said first coupling means to provide a connection between said connector bar and said support member and comprises a wedge-shaped rail member with a blunt end and a curved end.

2. A support apparatus as claimed in claim 1, wherein:
   (a) said first coupling means includes at least one pair of parallel "L" shaped tabs that form a track.

3. A support apparatus as claimed in claim 2, wherein said first coupling means is formed of more than one pair of parallel tabs aligned along the longitudinal axis of said connector bar each pair comprising a first and second end.

4. A support apparatus as claimed in claim 3, wherein said first coupling means includes at said first end of one pair of parallel tabs a limit of movement means.

5. A support apparatus as claimed in claim 1, wherein said support member is a bracket bar that can be semi-permanently affixed to a surface as desired by a user.

6. A support apparatus as claimed in claim 5, wherein said bracket bar includes:

(a) a first generally flat side with means to affix said first flat side to said desired surface;

(b) a second generally flat side opposite said first side including said second coupling means.

7. A support apparatus as claimed in claim 6, wherein:

(a) said first coupling means is formed of a pair of parallel "L" shaped tabs that form a track and a limit of movement means.

8. A support apparatus as claimed in claim 7, wherein said first coupling means is formed of more than one pair of parallel tabs aligned along the longitudinal axis of said connector bar wherein only one of such pairs of tabs includes a limit of movement means.

9. A support apparatus as claimed in claim 1, wherein said first coupling means and said second coupling means are slidably engageable with one another.

10. An accessory support apparatus for a hand held electronic device to provide hands free use and stability thereof, said support apparatus comprising:

(a) an elongated universal connector bar that includes;
  (1) a first generally flat side with means to affix said universal connector bar to said hand held device;
  (2) a second generally flat side opposite said first flat side;
  (3) an integrally formed and raised first coupling means on said second side including at least one pair of parallel "L" shaped tabs that form a track each said pair aligned along the longitudinal axis of said connector bar and comprising a first and second end; and
  (4) said first coupling means further comprising a limit of movement means at said first end of one pair of parallel tabs;

(b) a support member comprising a support stand that is utilized as a strut to hold up one end of said hand held device.

11. An accessory support apparatus for a hand held electronic device to provide hands free use and stability thereof, said support apparatus comprising:

(a) an elongated universal connector bar that includes;
  (1) a first generally flat side with means to affix said universal connector bar to said hand held device;
  (2) a second generally flat side opposite said first flat side;
  (3) an integrally formed and raised first coupling means on said second side including at least one pair of parallel "L" shaped tabs that form a track each said pair aligned along the longitudinal axis of said connector bar and comprising a first and second end; and
  (4) said first coupling means further comprising a limit of movement means at said first end of one pair of parallel tabs;

(b) a support stand comprising:
  (1) a leg portion;
  (2) a bracket portion on which is integrally formed said second coupling means; and
  (3) a hinge portion located between said leg portion and said bracket portion.

12. A support apparatus as claimed in claim 11 wherein said support stand further comprises a lock tab associated with said hinge portion for locking said leg portion in place.

13. A support apparatus as claimed in claim 12, wherein said support stand and said locking tab are made of polypropylene such that when said hinge is opened said locking tab stays in place relative to said leg thereby providing stability to said leg.

14. A support apparatus as claimed in claim 11 wherein said leg portion of said support stand further comprises at least two feet each with a bottom edge which is tapered to prevent slippage.

* * * * *